United States Patent
Namura

(10) Patent No.: US 10,664,818 B2
(45) Date of Patent: *May 26, 2020

(54) CHECK-OUT SYSTEM, PAYMENT APPARATUS, INPUT PROCESSING APPARATUS, AND CONTROL PROGRAM

(71) Applicant: TOSHIBA TEC KABUSHIKI KAISHA, Tokyo (JP)

(72) Inventor: Shinya Namura, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 17 days.

This patent is subject to a terminal disclaimer.

(21) Appl. No.: 15/941,925

(22) Filed: Mar. 30, 2018

(65) Prior Publication Data

US 2018/0225644 A1     Aug. 9, 2018

Related U.S. Application Data

(63) Continuation of application No. 15/190,743, filed on Jun. 23, 2016, now abandoned.

(30) Foreign Application Priority Data

Jul. 1, 2015   (JP) ................. 2015-132823

(51) Int. Cl.
*G06Q 20/20*      (2012.01)
*G07G 1/14*       (2006.01)
(Continued)

(52) U.S. Cl.
CPC ........... *G06Q 20/202* (2013.01); *G06Q 20/18* (2013.01); *G06Q 20/20* (2013.01); *G07G 1/14* (2013.01); *G07G 1/0036* (2013.01)

(58) Field of Classification Search
CPC ..... G06Q 20/201; G06Q 20/405; G06Q 40/02
(Continued)

(56) References Cited

U.S. PATENT DOCUMENTS

| 4,893,237 A | 1/1990 | Unno |
| 8,275,702 B1 * | 9/2012 | Enriquez ............ G06Q 40/02 |
| | | 705/39 |

(Continued)

FOREIGN PATENT DOCUMENTS

| EP | 1528519 A2 | 5/2005 |
| JP | 2013-242839 | 12/2013 |

(Continued)

OTHER PUBLICATIONS

Shivaratri et al. "Load distributing for locally distributed systems," Computer, IEEE, vol. 25, No. 12, Dec. 1, 1992, pp. 33-44.

(Continued)

*Primary Examiner* — Olusegun Goyea
(74) *Attorney, Agent, or Firm* — Kim & Stewart LLP

(57) ABSTRACT

According to an embodiment, a check-out system includes a plurality of the payment apparatuses in communication with each other and with a registration apparatus. A payment processor processes a payment in accordance with received payment information and a customer input. A storage unit stores received payment information when the payment apparatus is available to process payment. A transmission unit of a payment apparatus transmits received payment information to another payment apparatus of the plurality of payment apparatuses when the payment apparatus is unavailable to currently process the received payment information.

20 Claims, 9 Drawing Sheets

(51) Int. Cl.
*G06Q 20/18* (2012.01)
*G07G 1/00* (2006.01)

(58) Field of Classification Search
USPC .......................................... 705/26.1, 39, 44
See application file for complete search history.

(56) References Cited

U.S. PATENT DOCUMENTS

| | | | |
|---|---|---|---|
| 8,589,259 B2* | 11/2013 | Kunieda | G06Q 20/201 705/26.1 |
| 2015/0178708 A1* | 6/2015 | Reutov | G06Q 20/405 705/44 |
| 2017/0004474 A1 | 1/2017 | Namura | |

FOREIGN PATENT DOCUMENTS

| JP | 2014-006856 A | | 1/2014 |
|---|---|---|---|
| JP | 2014-10617 A | | 1/2014 |
| JP | 2014006856 A | * | 1/2014 |
| JP | 2017-016413 A | | 1/2017 |

OTHER PUBLICATIONS

Extended European Search Report dated Sep. 29, 2016 in corresponding European Patent Application No. 16177546.5 (Publication No. EP 3113128 A1), 9 pages.

Office Action dated Aug. 2, 2018 in corresponding European Patent Application No. 16177546.5 (Publication No. EP 3113128 A1), 6 pages.

Japanese Office Action filed Sep. 26, 2017 in counterpart Japanese Patent Application No. 2016-177818 (8 pages) (with machine translation).

Japanese Notice of Reasons for Refusal dated Sep. 17, 2019, filed in corresponding Japanese Patent Application No. 2018-209846, 4 pages (with Translation).

Japanese Decision of Refusal dated Nov. 26, 2019, filed in corresponding Japanese Patent Application No. 2018-209846, 4 pages (with Translation).

* cited by examiner

FIG. 3
| MERCHANDISE CODE | MERCHANDISE NAME | UNIT PRICE | NUMBER | AMOUNT OF MONEY |
|---|---|---|---|---|
| 123456789 | MERCHANDISE A | 121 | 1 | 121 |
| 123123123 | MERCHANDISE B | 298 | 1 | 298 |
| 123789456 | MERCHANDISE C | 498 | 1 | 498 |
| ⋮ | ⋮ | ⋮ | ⋮ | ⋮ |
31
| TOTAL NUMBER | TOTAL AMOUNT OF MONEY |
|---|---|
| a | b |
32
33 — DESTINATION ID
FIG. 4
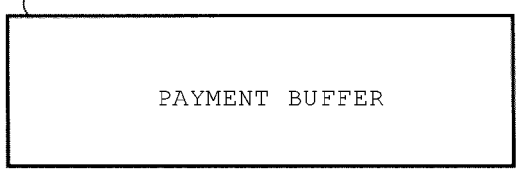
41 — PAYMENT BUFFER
42 — BUSY FLAG F
43 — TRANSFER DESTINATION ID

FIG. 7

|  | MERCHANDISE NAME | NUMBER | UNIT PRICE | AMOUNT OF MONEY | |
|---|---|---|---|---|---|
| 1 | MERCHANDISE A | 1 | 121 | 121 | IN |
| 2 | MERCHANDISE B | 1 | 298 | 298 | IN |
| 3 | MERCHANDISE C | 1 | 498 | 498 | IN |
|  |  |  |  |  |  |
|  |  |  |  |  |  |
|  |  |  |  |  |  |
|  |  |  |  |  |  |

MERCHANDISE D

| IN ONE PIECE | 81 YEN | TOTAL | 4 PIECES 998 YEN |
|---|---|---|---|

FIG. 8

| 1 | PAYMENT |
|---|---|

| TOTAL | 4 PIECES | 998 YEN |
|---|---|---|

PLEASE OPERATE WHEN DISCOUNT IS GIVEN TO SUBTOTAL

B1 — SUBTOTAL DISCOUNT (YEN)    SUBTOTAL DISCOUNT (%) — B2

B4 — TRANSMIT    RETURN TO REGISTRATION DETAILS — B3

CHECK-OUT SYSTEM, PAYMENT APPARATUS, INPUT PROCESSING APPARATUS, AND CONTROL PROGRAM

CROSS-REFERENCE TO RELATED APPLICATIONS

This application is a continuation of U.S. patent application Ser. No. 15/190,743, filed on Jun. 23, 2016, which is based upon and claims the benefit of priority from Japanese Patent Application No. 2015-132823, filed on Jul. 1, 2015, the entire contents of each of which are incorporated herein by reference.

FIELD

Embodiments described herein relate generally to a check-out system that includes a payment apparatus and an input processing apparatus, and a control program causing a computer to implement functions of the payment apparatus.

BACKGROUND

In a known check-out system for a mass retailer, an input processing apparatus for merchandise data and a payment apparatus for transaction are separated. The input processing apparatus waits for the input of data relating to merchandise sales. When data is input by an operator, the input processing apparatus generates payment information based on the data, and transmits the payment information to the payment apparatus. The payment apparatus waits for the input of payment data for the payment information. When the payment data is input by the operator, the payment apparatus processes payment based on the payment information and the payment data. If the check-out system includes the input processing apparatus for merchandise data separate from the payment apparatus, a salesperson can operate the input processing apparatus and a shopper can operate the payment apparatus in a semi-self-service arrangement.

In the semi-self-service arrangement, it may take more time for the shopper to operate the payment apparatus. Thus, it is desirable to substantially eliminate the situation in which a subsequent shopper has to wait for payment. For this reason, in a conventional check-out system the number of payment apparatuses may be larger than the number of input processing apparatuses. In one arrangement, an input processing apparatus monitors the status of each payment apparatus, automatically selects an unoccupied payment apparatus, and transmits the payment information to the selected payment apparatus. In another arrangement, the state of each payment apparatus is displayed on the display of the input processing apparatus, a salesperson selects an unoccupied payment apparatus, and the payment information is transmitted to the payment apparatus selected by the salesperson.

In either arrangement, since the input processing apparatus monitors the status of each payment apparatus, the input processing apparatus is required to have an information analysis function of collecting and analyzing the status of the payment apparatus.

DESCRIPTION OF THE DRAWINGS

FIG. 3 is a schematic view illustrating a table stored in a RAM of the merchandise registration apparatus.

FIG. 4 is a schematic view illustrating a buffer items stored in RAM of the payment apparatus.

FIG. 7 is a schematic view illustrating an example of a registration screen displayed on a display of the merchandise registration apparatus.

FIG. 8 is a schematic view illustrating an example of a transmission screen displayed on the display of the merchandise registration apparatus.

DETAILED DESCRIPTION

According to an embodiment, a check-out system includes a plurality of the payment apparatuses in communication with each other and with a registration apparatus. A payment processor processes a payment in accordance with payment information received from the registration apparatus and a customer input. A storage unit stores received payment information when the payment apparatus is available to process payment. A transmission unit of the payment apparatus transmits received payment information to another payment apparatus of the plurality of payment apparatuses when the payment apparatus is unavailable to currently process the received payment information.

Hereinafter, a description will be given of an embodiment of a check-out system in which an input processing apparatus is not required to collect the status of each payment apparatus, with reference to the drawings.

This embodiment describes a semi-self-service check-out system which is provided in a store such as a mass retailer. In this system, a salesperson operates a merchandise registration apparatus which is an aspect of the input processing apparatus. A shopper operates the payment apparatus.

Figure 1:
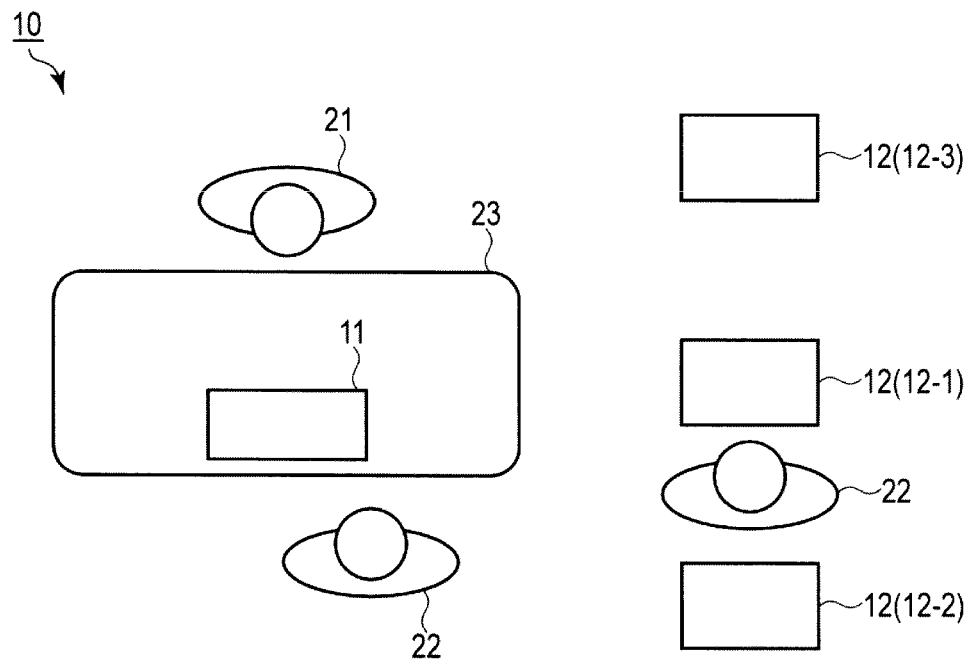
FIG. 1 is a schematic view of a check-out system according to an embodiment.
Figure 1:
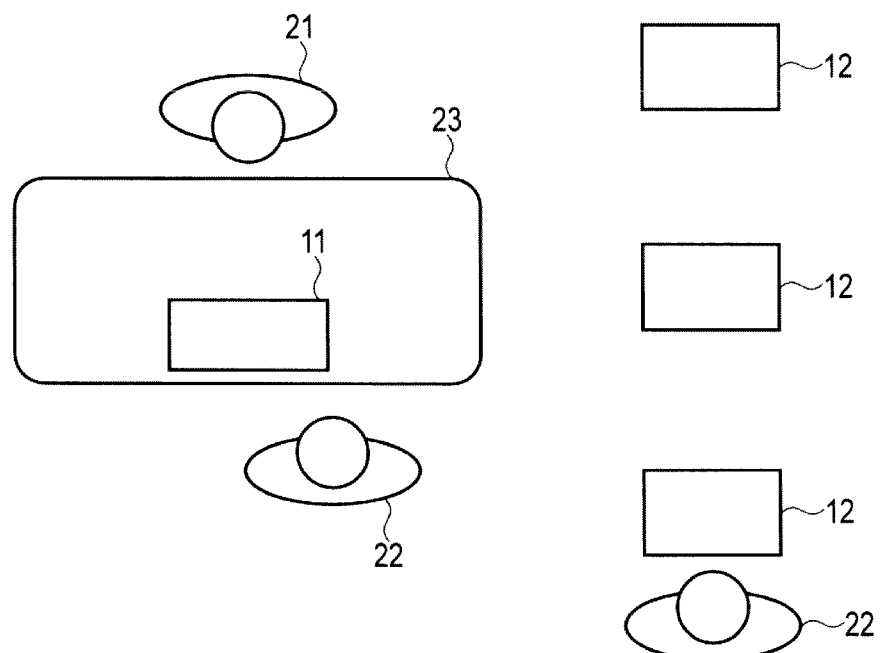

FIG. 1 is a schematic view of a check-out system 10 according to an embodiment. The check-out system 10 includes a plurality of merchandise registration apparatuses 11, and payment apparatuses 12 of a number larger than the number of the merchandise registration apparatuses 11. The merchandise registration apparatuses 11 and the payment apparatuses 12 are arranged in check-out lanes in a store.

FIG. 1 illustrates a case where two merchandise registration apparatuses 11 and six payment apparatuses 12 are arranged in two check-out lanes. In FIG. 1, one merchandise registration apparatus 11 and three payment apparatuses 12 are arranged for one check-out lane. The number of merchandise registration apparatuses 11 and payment apparatuses 12 which are included in the check-out system 10 is arbitrary. The ratio between the number of merchandise registration apparatuses 11 and the number payment apparatuses 12, which are arranged in the check-out lane, is arbitrary.

The operator of the merchandise registration apparatus 11 is a salesperson 21 who works as a checker. The operator of the payment apparatus 12 is a shopper 22 who purchases merchandise sold at the store. In addition, the salesperson 21 may operate the payment apparatus 12 in some cases.

The merchandise registration apparatus 11 is attached to a work table 23 in FIG. 1. The work table 23 has a rectangular top plate. A plurality of work tables 23 are arranged so as to be substantially parallel in the longitudinal directions of the top plates to form pas sages (checkout lanes) for shoppers 22.

The merchandise registration apparatus 11 performs the following functions: registration process of purchase merchandise, generation of payment information, and transmission of the payment information to the payment apparatus 12. In the registration process, the shopper 22 or salesperson 21 registers merchandise that the shopper has selected as purchase merchandise. The payment process is a process of paying for the merchandise. The payment information is information required in the payment process.

The payment apparatus 12 performs the payment process based on the payment information, according to the payment information received from the merchandise registration apparatus 11.

Figure 2:
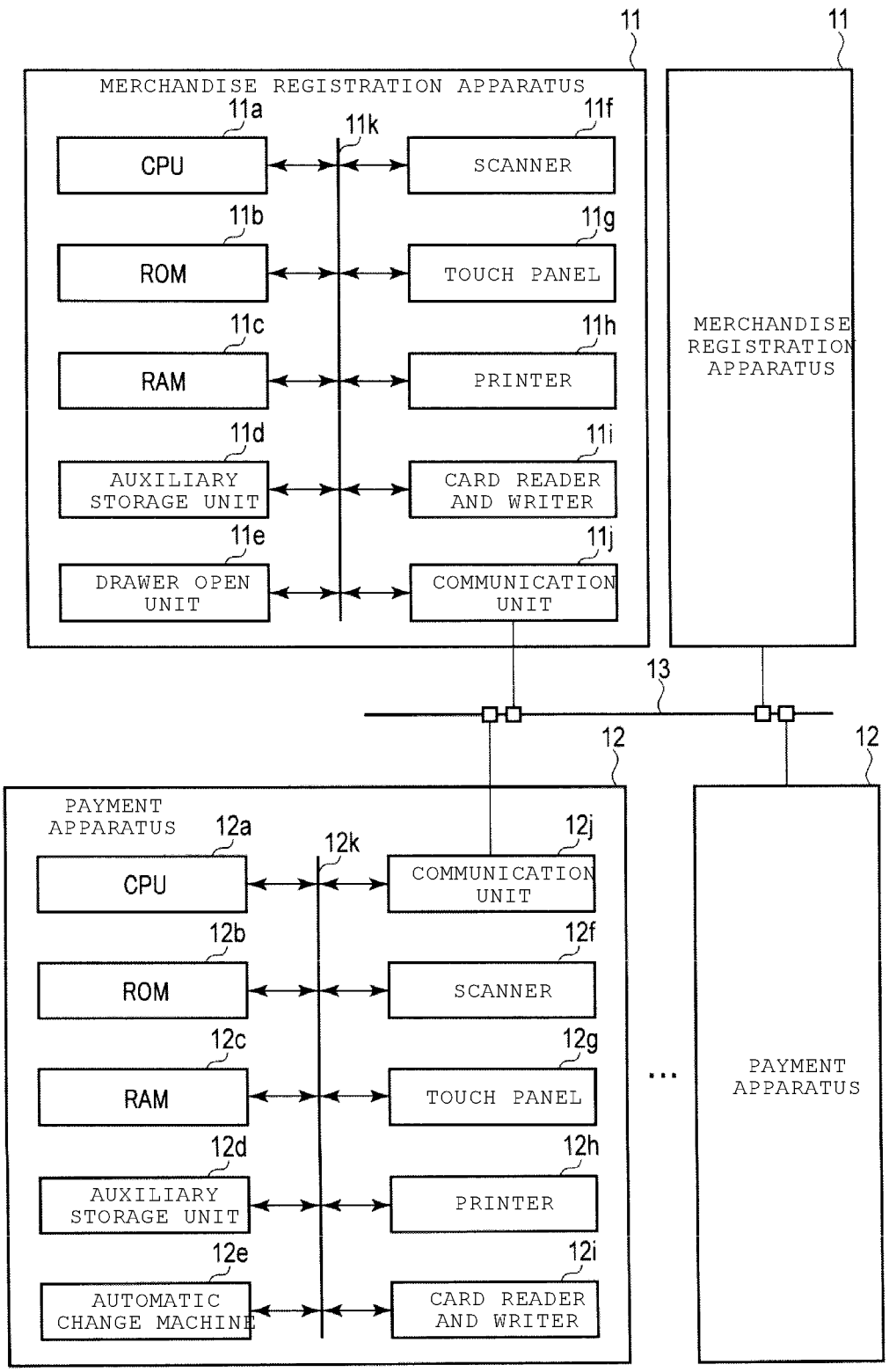
FIG. 2 is a block diagram illustrating circuit configurations of a merchandise registration apparatus and a payment apparatus according to the embodiment.

FIG. 2 is a block diagram illustrating the respective circuit configurations of the merchandise registration apparatus 11 and the payment apparatus 12. The merchandise registration apparatus 11 and the payment apparatus 12 are connected to each other through a network 13 such as a local area network (LAN). Other networks such as the Internet or a wireless LAN can be used for the network 13, instead of the LAN. Alternatively, the merchandise registration apparatus 11 and the payment apparatus 12 may exchange information through a server or via a direct connection (wired or wireless).

The merchandise registration apparatus 11 includes a central processing unit (CPU) 11a, a read only memory (ROM) 11b, a random access memory (RAM) 11c, an auxiliary storage unit 11d, a drawer open unit 11e, a scanner 11f, a touch panel 11g, a printer 11h, a card reader and writer 11i, a communication unit 11j, and a transmission system 11k.

The CPU 11a, the ROM 11b, the RAM 11c and the auxiliary storage unit 11d are connected by the transmission system 11k, and may be provided as a computer.

The CPU 11a corresponds to the central processor of the computer. The CPU 11a controls respective units so as to achieve various functions of the merchandise registration apparatus 11, based on the operating system, the middleware, and the application programs, which are stored in the ROM 11b and the RAM 11c.

The ROM 11b corresponds to the main memory storage portion of the computer. The ROM 11b stores the operating system. The ROM 11b may store the middleware and application programs in some cases. Further, the ROM 11b may also store data that is referred to when the CPU 11a performs various processes.

The RAM 11c corresponds to the main working memory portion of the computer. The RAM 11c stores data that is referred to when the CPU 11a performs various processes.

Further, the RAM 11c is utilized as a so-called work area for storing data that is temporarily used when the CPU 11a performs various processes.

The auxiliary storage unit 11d corresponds to the auxiliary memory portion of the computer. The auxiliary storage unit 11d stores data that is used when the CPU 11a performs various processes, or data that is generated through the process performed by the CPU 11a. As the auxiliary storage unit 11d, for example, an electric erasable programmable read only memory (EEPROM), a hard disk drive (HDD), a solid state drive (SSD), or the like may be used.

The application program stored in the ROM 11b or the auxiliary storage unit 11d includes a control program for controlling a control process to be described later. Transport and installation of the merchandise registration apparatus 11 is generally performed in the state where the control program is stored in the ROM 11b or the auxiliary storage unit 11d. However, the transport and installation of the merchandise registration apparatus 11 may be performed in the state where the control program is not stored in the ROM 11b or the auxiliary storage unit 11d in some cases. In this case, the control program is transferred to the merchandise registration apparatus 11 by being read from a removable recording medium such as a magnetic disk, a magneto-optical disk, an optical disk, and a semiconductor memory. Alternatively, the control program may be transferred through a network, and then written into the auxiliary storage unit 11d of the merchandise registration apparatus 11.

The drawer open unit 11e automatically opens a drawer that accommodates money.

The scanner 11f reads the information on the merchandise, and obtains the merchandise code of the merchandise. As the scanner 11f, well-known various scanners can be used. The scanner 11f may be only one of the various scanners, or may include a plurality of types. The scanner 11f may be a two-dimensional code scanner of a fixed type or a movable type. Alternatively, the scanner 11f may be a type that identifies the merchandise from the image of merchandise by using an image recognition technique.

The touch panel 11g includes a display device and a touch sensor. The display device may display a certain screen such as a GUI screen. As the display device, for example, a known device such as a color LCD may be used. The touch sensor is arranged to overlap the display surface of the display device. The touch sensor detects the operator's touch position on the display surface of the display device, and sends the position information to the CPU 11a. As the touch sensor, a known device can be used.

The printer 11h issues a receipt by printing various characters and/or images on the receipt paper. For the printer 11h, for example, a thermal printer, a dot impact printer, or the like may be used.

The card reader and writer 11i reads data recorded on the card and writes data onto the card. The card may include a membership card referred to as a members card or a point card, in addition to payment cards such as a credit card, a debit card, an electronic money card, and a prepaid card. The membership card has recorded information for identifying a member who owns at least the card. The card reader and writer 11i may be any one of devices of magnetic, contact, and contactless types, and may include a plurality of types of devices.

The communication unit 11j performs data communication with a plurality of payment apparatuses 12 which are connected through the network 13. The communication unit 11j can also perform data communication with other merchandise registration apparatuses 11 through the network 13.

The transmission system 11*k* transmits data items which are exchanged between the CPU 11*a*, the ROM 11*b*, the RAM 11*c*, the auxiliary storage unit 11*d*, the drawer open unit 11*e*, the scanner 11*f*, the touch panel 11*g*, the printer 11*h*, the card reader and writer 11*i*, and the communication unit 11*j*. As the transmission system 11*k*, a well-known transmission system including various buses such as a system bus and various interface circuits connecting the buses and respective units may be used.

As hardware of such merchandise registration apparatus 11, for example, a POS terminal which has an existing face-to-face sales type may be used.

The payment apparatus 12 includes a CPU 12*a*, a ROM 12*b*, a RAM 12*c*, an auxiliary storage unit 12*d*, an automatic change machine 12*e*, a scanner 12*f*, a touch panel 12*g*, a printer 12*h*, a card reader and writer 12*i*, a communication unit 12*j*, and a transmission system 12*k*.

The CPU 12*a*, the ROM 12*b*, the RAM 12*c* and the auxiliary storage unit 12*d* are connected by the transmission system 12*k* and may be provided as a computer.

The CPU 12*a* corresponds to the central processor of the computer. The CPU 12*a* controls respective units so as to perform various operations of the payment apparatus 12, based on the operating system, the middleware, and the application programs, which are stored in the ROM 12*b* and the RAM 12*c*.

The ROM 12*b* corresponds to the main memory storing portion of the computer. The ROM 12*b* stores the operating system. The ROM 12*b* may store the middleware and application programs in some cases. Further, the ROM 12*b* may also store data that is referred to when the CPU 12*a* performs various processes.

The RAM 12*c* corresponds to the main working memory portion of the computer. The RAM 12*c* stores data that is referred to when the CPU 12*a* performs various processes. Further, the RAM 12*c* is utilized as a so-called work area for storing data that is temporarily used when the CPU 12*a* performs various processes.

The auxiliary storage unit 12*d* corresponds to the auxiliary memory portion of the computer. The auxiliary storage unit 12*d* stores data used when the CPU 12*a* performs various processes, or data generated in the process performed by the CPU 12*a*. As the auxiliary storage unit 12*d*, for example, an EEPROM, a HDD, an SSD, or the like may be used.

The application program stored in the ROM 12*b* or the auxiliary storage unit 12*d* includes a control program for controlling a control process to be described later. The transport and installation of the payment apparatus 12 is generally performed in the state where the control program is stored in the ROM 12*b* or the auxiliary storage unit 12*d*. However, the transport and installation of the payment apparatus 12 may be performed in the state where the control program is not stored in the ROM 12*b* or the auxiliary storage unit 12*d* in some cases. In this case, the control program is transferred to the payment apparatus 12 by being read from a removable recording medium such as a magnetic disk, a magneto-optical disk, an optical disk, and a semiconductor memory. Alternatively, the control program may be transferred through a network and then written into the auxiliary storage unit 12*d* of the payment apparatus 12.

The automatic change machine 12*e* receives and holds coins and bills that are input. Further, the automatic change machine 12*e* discharges coins and bills as change.

The scanner 12*f* reads the information on the merchandise, and obtains the merchandise code of the merchandise. As the scanner 12*f*, well-known various scanners may be used. The scanner 12*f* may correspond to only one of the various scanners, or may correspond to a plurality of types. The scanner 12*f* may be a two-dimensional code scanner of a fixed type or a movable type. Alternatively, the scanner 12*f* may be a type that identifies the merchandise from the image of merchandise, by using an image recognition technique.

The touch panel 12*g* includes a display device and a touch sensor. In the display device, the display screen may display a certain screen such as a GUI screen. As the display device, for example, a known device such as a color LCD may be used. The touch sensor is arranged to overlap the display surface of the display device. The touch sensor detects the operator's touch position on the display surface of the display device, and sends the position information to the CPU 12*a*. As the touch sensor, a known device may be used.

The printer 12*h* issues a receipt by printing various characters and/or images on the receipt paper. As this type of printer, for example, a thermal printer, a dot impact printer, or the like may be used.

The card reader and writer 12*i* reads data recorded on the card and writes data onto the card. The card may include a membership card referred to as a members card or a point card, in addition to payment cards such as a credit card, a debit card, an electronic money card, and a prepaid card. The membership card has recorded information for identifying a member who owns the card. The card reader and writer 12*i* may be any one of devices of magnetic, contact, and contactless types, and may include a plurality of types of devices.

The communication unit 12*j* performs data communication with a plurality of merchandise registration apparatuses 11 which are connected through the network 13. The communication unit 12*j* can also perform data communication with other payment apparatuses 12 through the network 13.

The transmission system 12*k* transmits data pieces which are exchanged between the CPU 12*a*, the ROM 12*b*, the RAM 12*c*, the auxiliary storage unit 12*d*, the automatic change machine 12*e*, the scanner 12*f*, the touch panel 12*g*, the printer 12*h*, the card reader and writer 12*i*, and the communication unit 12*j*. As the transmission system 12*k*, a well-known transmission system including various buses such as a system bus and various interface circuits connecting the buses and respective units may be used.

As hardware of such payment apparatus 12, for example, a POS terminal which has an existing self-service arrangement can be used.

FIG. 3 is a schematic view illustrating a table 31 stored in the RAM 11*c* of the merchandise registration apparatus 11. As illustrated in FIG. 3, the table 31 stores a plurality of records each including a merchandise code, a merchandise name, a unit price, the quantity number, and the amount of money required for purchase. The merchandise code is a unique code for identifying each piece of merchandise individually. For example, a merchandise code which is represented by the bar code is assigned to each piece of merchandise. The merchandise name and the unit price are respectively the name and the price per a piece of the merchandise that is specified by the merchandise code on the same record. The quantity number and the amount of money are sales data of the merchandise that is specified by the merchandise code on the same record, in other words, the sales quantity and the amount of money for the quantity of the particular merchandise.

The check-out system 10 is connected to a database server through the network 13. The database server includes a merchandise database for setting merchandise information such as the merchandise name and the unit price, in association with the merchandise code of each piece of merchandise. In the merchandise registration apparatus 11, when the merchandise code is acquired, the CPU 11a sends the merchandise code and a request for the merchandise information to the database server with the merchandise code. The database server, which receives the request, accesses the merchandise database, reads the merchandise information which is associated with in the merchandise code from the merchandise database, and transmits the merchandise information to the merchandise registration apparatus 11 through the network 13. The CPU 11a of the merchandise registration apparatus 11 stores the merchandise information received from the database server in the table 31. In the following, the table 31 is referred to as the registration merchandise table 31.

The memory area 32 is an area for storing the total quantity number and the total amount of money. The total number is the sum of the quantity numbers indicated in the respective records stored in the registration merchandise table 31. The total amount of money is the sum of the amounts of money indicated in the respective records stored in the registration merchandise table 31. Hereinafter, the memory area 32 is referred to as a total table 32.

A memory area 33 stores a transmission destination ID for specifying the payment apparatus 12 which is the transmission destination of the payment information. The merchandise registration apparatus 11 transmits the payment information which is generated based on the registration process of purchase merchandise, to the payment apparatus 12 through the network 13. In this case, the merchandise registration apparatus 11 transmits the payment information, to one predetermined payment apparatus 12 through the network 13. Specifically, the merchandise registration apparatus 11 transmits payment information to one payment apparatus 12 which is determined from a plurality of (three in FIG. 1) payment apparatuses 12 which are arranged in the same check-out lane. In other words, the ID for specifying the one determined payment apparatus 12 is stored in the memory area 33, as a transmission destination ID.

FIG. 4 is a schematic view illustrating buffer items stored in the RAM 12c of the payment apparatus 12. In FIG. 4, a memory area 41 temporarily stores the payment information which is received from the merchandise registration apparatus 11. Hereinafter, the memory area 41 is referred to as a payment buffer 41.

The memory area 42 includes a busy flag F. The busy flag F is information for identifying whether or not the payment process is being performed based on the payment information. In the present embodiment, the busy flag F is reset as "0" when the payment process is not being performed, and the busy flag F is set as "1" when the payment process is being performed.

The memory area 43 stores the transfer destination ID for specifying another payment apparatus 12 which is the transfer destination of payment information. When the payment apparatus 12 executes the payment process, based on the payment information stored in the payment buffer 41, even when another piece of payment information is received, the payment apparatus 12 cannot performs the payment process. In this case, the payment apparatus 12 transfers the payment information that is received during the payment process, to another payment apparatus 12 through the network 13. Specifically, the payment apparatus 12 transfers the payment information to another single payment apparatus 12 that is set in advance, among a plurality of (three in FIG. 1) payment apparatuses 12 which are arranged in the same check-out lane. In other words, an ID for identifying another single payment apparatus 12 that is set is stored in the memory area 43, as the transfer destination ID.

In addition, the transfer destination ID is not stored in the memory area 43 of the payment apparatus 12 at which the payment information was last transferred, among the plurality of payment apparatuses 12 which are arranged in the same check-out lane. Alternatively, information indicating that the transfer destination ID is not set may be stored. In addition, the communication address of the merchandise registration apparatus 11 which is arranged in the same check-out lane may be stored in an area other than the memory area 43.

Figure 5:
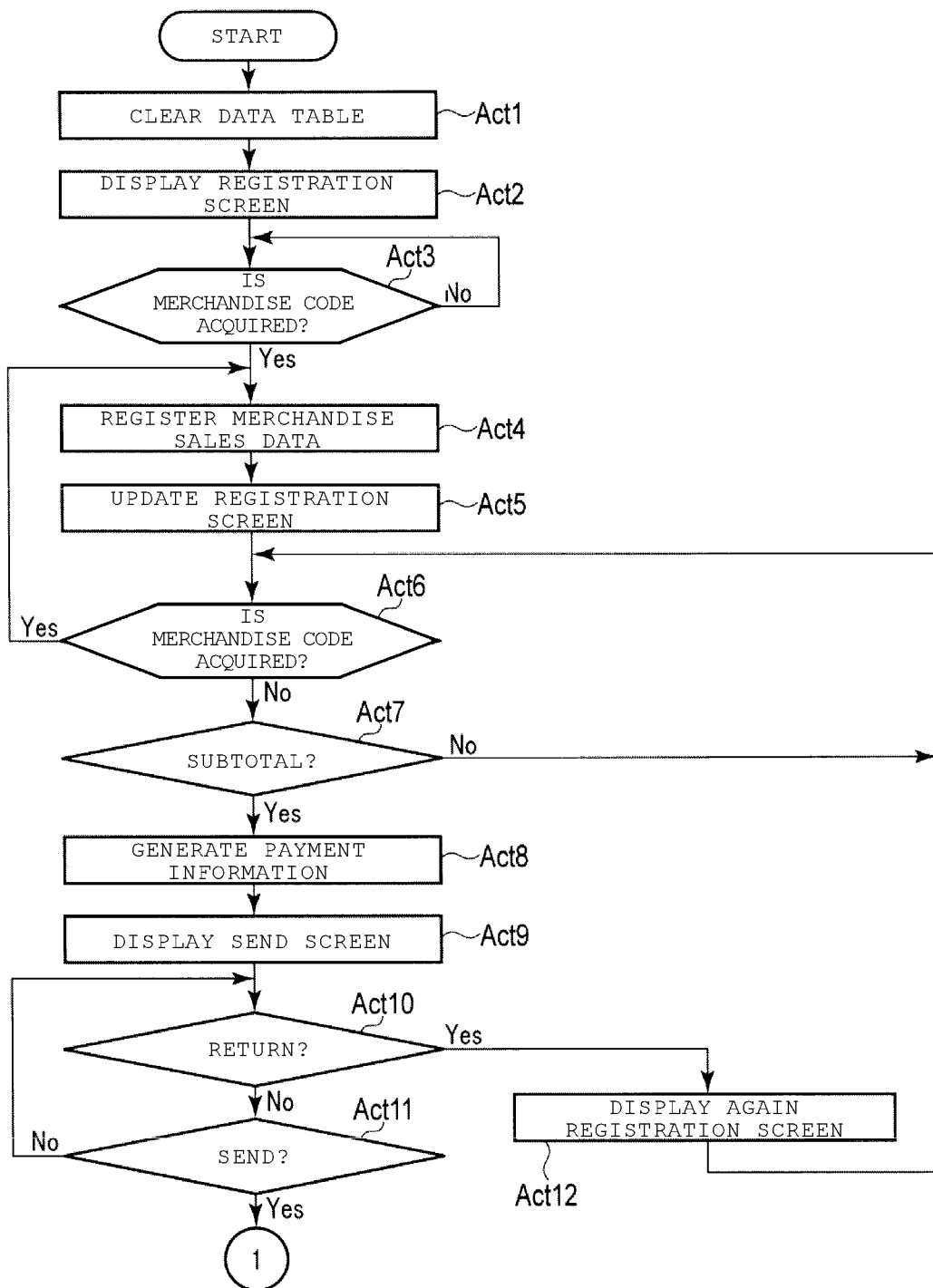
FIG. 5 is a flow chart illustrating an example sequence of operations performed by a CPU of the merchandise registration apparatus in accordance with a control program.
Figure 6:
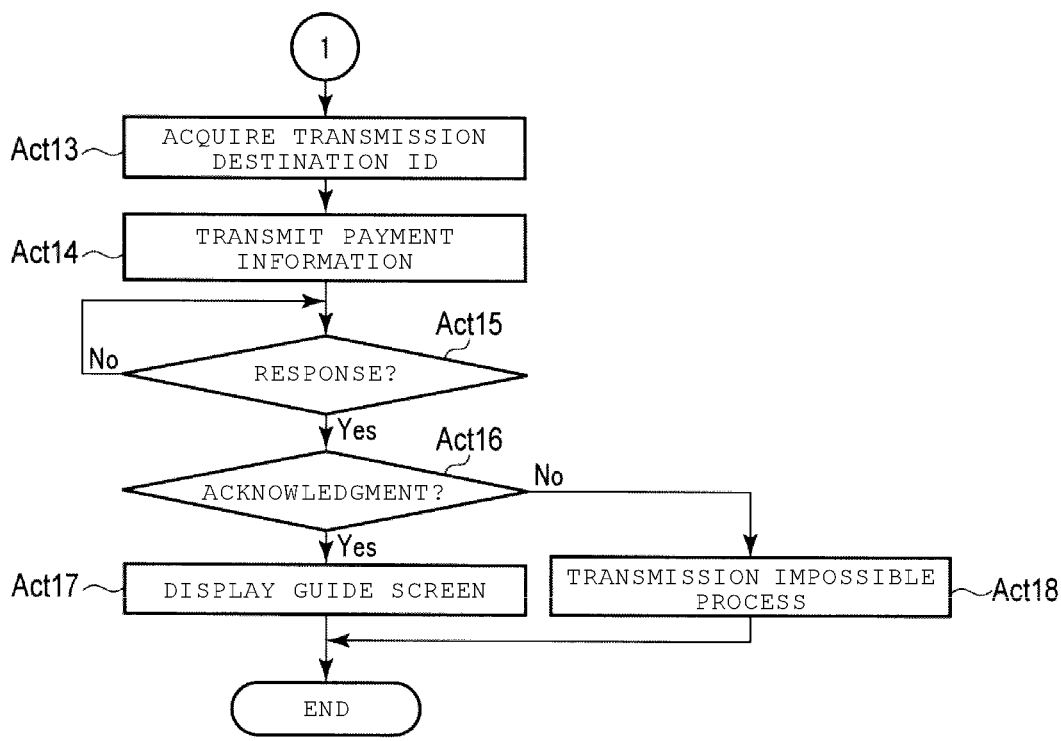
FIG. 6 is a flow chart illustrating a further sequence of operations performed by the CPU of the merchandise registration apparatus in accordance with the control program.
Figure 9:
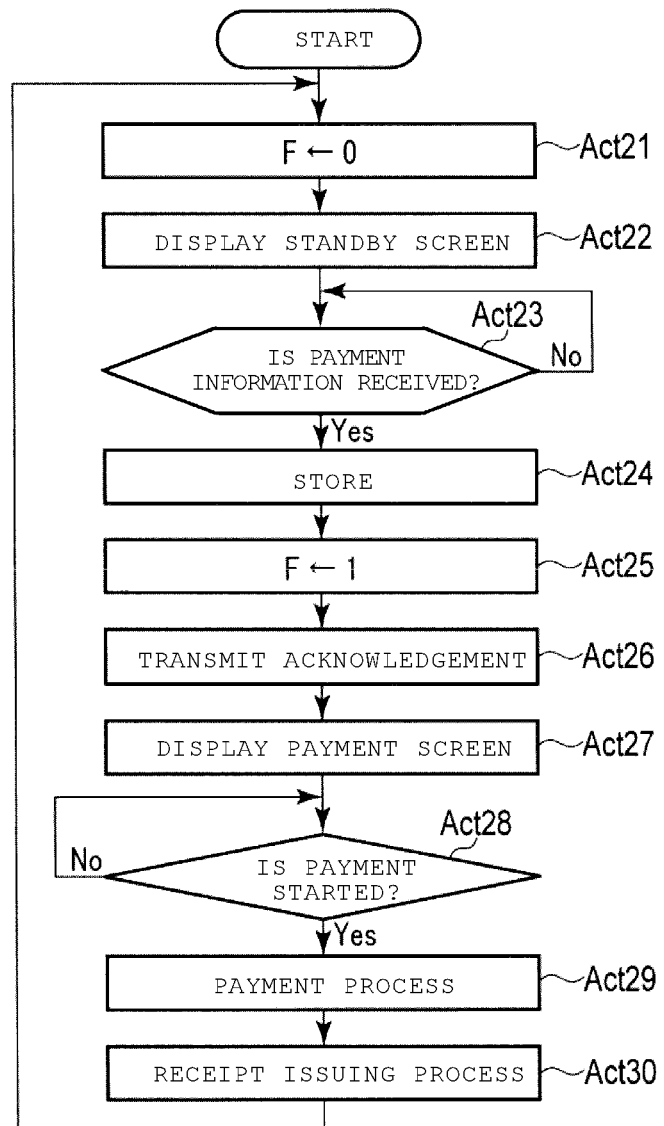
FIG. 9 is a flow chart illustrating an example sequence of operations performed by a CPU of the payment apparatus in accordance with a control program.
Figure 10:
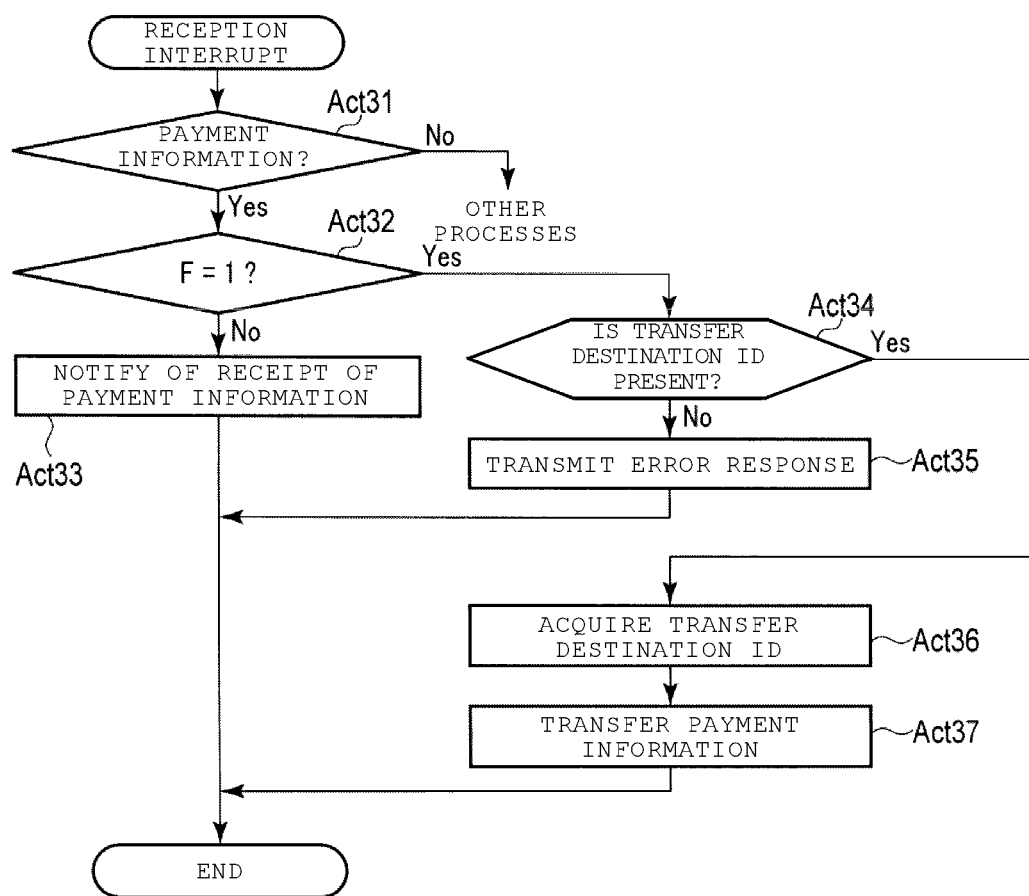
FIG. 10 is a flow chart illustrating an additional sequence of operations performed by the CPU of the payment apparatus in accordance with the control program.
Figure 11:
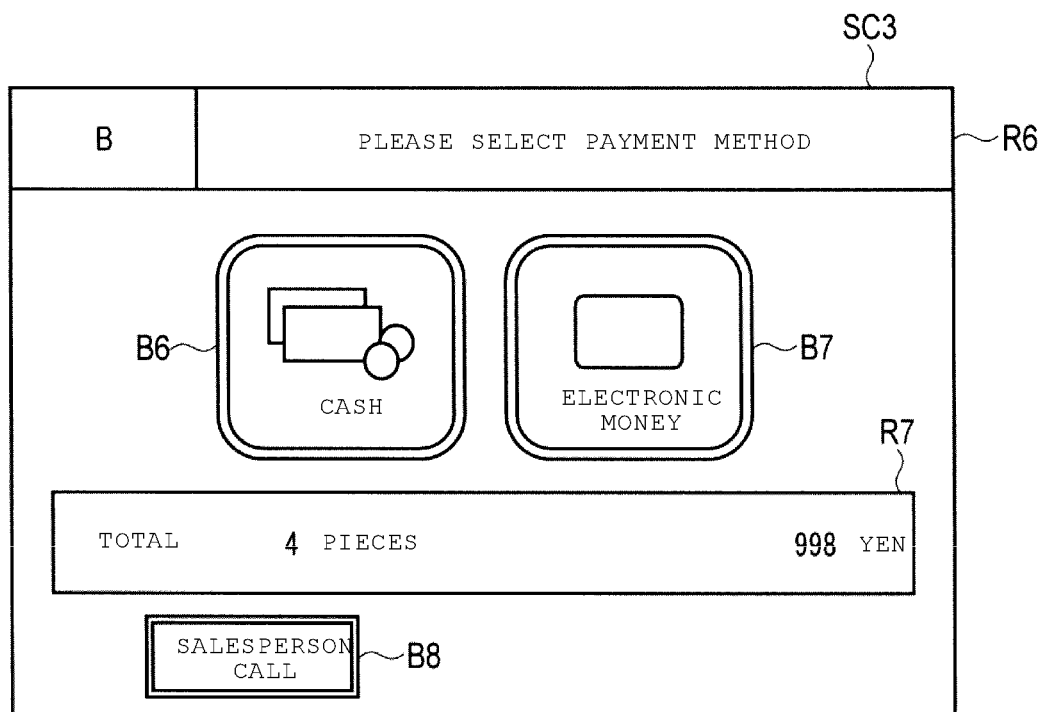
FIG. 11 is a schematic view illustrating an example of a payment screen displayed on the screen of the payment apparatus.
Figure 12:
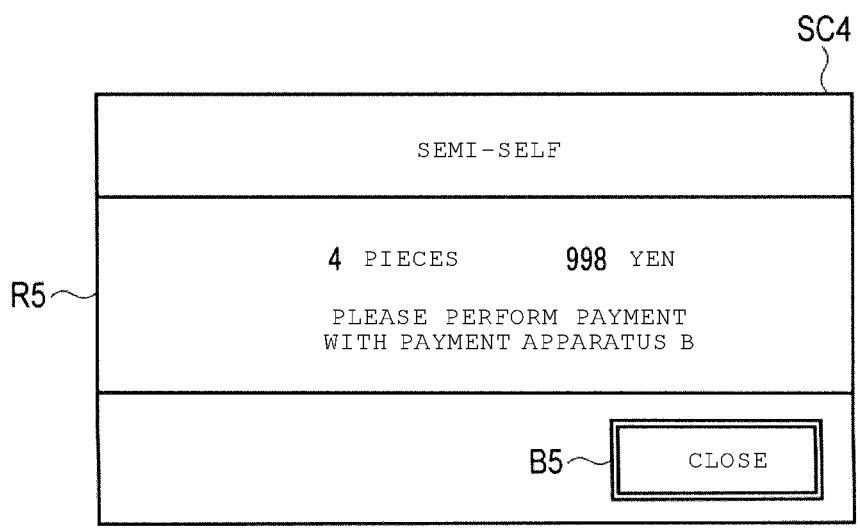
FIG. 12 is a schematic view illustrating an example of a guide screen displayed on the screen of the merchandise registration apparatus.

FIGS. 5 and 6 are flow charts illustrating an example sequence of operations performed by the CPU 11a of the merchandise registration apparatus 11 in accordance with a control program. FIGS. 7, 8 and 12 are schematic views illustrating examples of various screens displayed on the touch panel 11g of the merchandise registration apparatus 11. FIG. 9 is a flowchart illustrating an example sequence of operations performed by the CPU 12a of the payment apparatus 12 in accordance with a control program. FIG. 10 is a flow chart illustrating an example sequence of operations performed in a reception interrupt process that the CPU 12a executes in accordance with the same control program. FIG. 11 is a schematic view illustrating an example of a payment screen displayed on the touch panel 12g of the payment apparatus 12. Hereinafter, the operation of the check-out system 10 will be described with reference to the drawings. Incidentally, the content of the processing to be described below is an example, and it is possible to appropriately utilize various processes capable of achieving the same result.

First, a description will be given regarding the operation of the merchandise registration apparatus 11.

When the merchandise registration apparatus 11 is activated in the mode of performing the registration process of merchandise selected by a shopper 22, the CPU 11a starts the control process of the procedure illustrated in FIG. 5. First, the CPU 11a clears the registration merchandise table 31 and the total table 32 (Act 1). Next, the CPU 11a displays a registration screen SC1 on a portion of the screen of the touch panel 11g (see FIG. 7) (Act 2).

The registration screen SC1 represents the contents of a registration merchandise table 31a and a total table 32a, and allows the salesperson 21 to check the status of the registration process. An example of the registration screen SC1 is illustrated in FIG. 7. The registration screen SC1 includes display areas R1 and R2. The display area R1 represents the merchandise name, the number, and the unit price of the most recently registered merchandise, as well as the total number and the total amount of money of all of the merchandise currently registered. The display area R2 displays the list of merchandise names, the numbers, the unit prices, and the amounts of money of the merchandise that has been registered prior to the merchandise displayed on the registration screen SC1.

In addition, the CPU 11a causes the touch panel 11g to display various function buttons such as a merchandise button by which the salesperson 21 designates the merchandise, or a subtotal button.

When the registration screen SC1 is displayed, the salesperson 21 sequentially inputs the merchandise codes of the merchandise that the shopper 22 purchases, by operating, for example, the scanner 11f and the merchandise button. Then, when the input of the merchandise codes of all of purchase merchandise is completed, the salesperson 21 touches the subtotal button.

The CPU 11a which displays the registration screen SC1 waits for the acquisition of the merchandise code of the merchandise to be purchased (Act 3). When the merchandise code, which is input through the scanner 11f or the merchandise button, is acquired (YES at Act 3), the CPU 11a acquires the merchandise information such as the merchandise name and the unit price, which is set in the merchandise database in association with the merchandise code. The CPU 11a multiplies the sales number by the unit price, and calculates the sales amount of money. The CPU 11a registers merchandise sales data containing the merchandise code, the merchandise name, the unit price, the number of sales, and sales amount of money as a single record, in the registration merchandise table 31a (Act 4). Further, the CPU 11a adds the sales number and the sales amount of money in the total table 32a. The CPU 11a updates the registration screen SC1 to correspond to the contents of the registration merchandise table 31a and the total table 32a (Act 5).

After updating the registration screen SC1, the CPU 11a checks whether or not an additional merchandise code of merchandise to be purchased is acquired (Act 6). When the merchandise code is not acquired (NO at ACT 6), the CPU 11a checks whether or not the subtotal button is touched (Act 7). When the subtotal button is not touched (NO at Act 7), the CPU 11a checks again whether or not the merchandise code is acquired (Act 6). Therefore, the CPU 11a waits for either the acquisition of an additional merchandise code or the touch of the subtotal button, as Act 6 and Act 7. In addition, the CPU 11a may check the occurrence of other events such as execution of other operations, in the standby state herein, and then proceed to the process according to the occurred event.

In the standby state of Act 6 and Act 7, when the merchandise code is acquired (YES at Act 6), the CPU 11a returns to the process of Act 4. The CPU 11a repeats the following processing in the same manner as described above.

In the standby state of Act 6 and Act 7, when the subtotal button is touched (YES at Act 7), the CPU 11a generates payment information based on the contents of the registration merchandise table 31a and the total table 32a at this point of time (Act 8) In Act 8, the CPU 11a functions as a generation unit. The CPU 11a displays a send screen SC2 in a portion of the screen of the touch panel 11g (see FIG. 8) (Act 9).

An example of the send screen SC2 is illustrated in FIG. 8. The send screen SC2 includes display areas R3 and R4, and buttons B1, B2, B3, and B4. The display area R3 displays the total quantity number and the total amount of money of the total table 32a. The display area R4 displays various messages. The buttons B1 and B2 allow the salesperson 21 to give a discount on the total amount of money. The button B3 allows the salesperson 21 to return a to the registration screen SC1. The button B4 allows the salesperson 21 to transmit the payment information to the payment apparatus 12. In the following description, the button B3 is referred to as return button B3, and the button B4 is referred to as send button B4.

When the send screen SC2 is displayed, the CPU 11a checks whether or not the return button B3 is operated (Act 10). In a case where the return button B3 is not operated (NO at ACT 10), the CPU 11a checks whether or not the send button B4 is operated (Act 11). In a case where the send button B4 is not operated (NO at Act 11), the CPU 11a again checks whether or not the return button B3 is operated (Act 10). Therefore, the CPU 11a waits for the operation of the return button B3 or the send button B4, as Act 10 and Act 11. In addition, the CPU 11a may check the occurrence of other events such as execution of other operations, and proceed to execute the process according to the occurred event. For example, when the salesperson 21 touches any of the buttons B1 and B2, the CPU 11a changes the total amount of money which is included in the payment information, in response to the subsequent instruction by the salesperson 21.

In the standby state of Act 10 and Act 11, when the return button B3 is operated (YES at Act 10), the CPU 11a returns part area of the screen of the touch panel 11g to the registration screen SC1 (Act 12). Thereafter, the CPU 11a proceeds to the process of Act 6, and repeats the following processing in the same manner as described above.

When the send button B4 is operated (YES at Act 11) in the standby state of Act 10 and Act 11, the CPU 11a proceeds to the process of Act 13 in FIG. 6. In other words, the CPU 11a acquires a transmission destination ID that is set in the memory area 33 (Act 13). Then, the CPU 11a transmits the payment information that is generated in the process of Act 8, to a single payment apparatus 12 that is identified by the transmission destination ID (Act 14). In Act 14, the CPU 11a controls the communication unit 11j to function as a transmission unit.

Specifically, the CPU 11a controls the communication unit 11j so as to transmit the payment information via the network 13. The communication address for a single payment apparatus 12 that is identified by the transmission destination ID is set as a transmission destination address. By using the communication address that is set in the merchandise registration apparatus as the destination address, the payment information is transmitted to a single payment apparatus 12 that is identified by the transmission destination ID, through the network 13. In this manner, the transmission destination ID is associated with the communication address that is set in the payment apparatus 12. Alternatively, the transmission destination ID may be the communication address that is set in the payment apparatus 12.

The payment information that is transmitted through the network 13 is received by the payment apparatus 12 which has a communication address that matches the transmission destination address. Since the payment apparatus 12 that receives the payment information stores the source address of the payment information, it is possible to specify the merchandise registration apparatus 11 that is the transmission source of the payment information.

After the payment information is transmitted, the CPU 11a waits for a response signal from the payment apparatus 12 (Act 15). As will be described later, the payment apparatus that receives the payment information may return an acknowledgment signal to the merchandise registration apparatus 11, or return an error response signal. When the response signal is received through the communication unit 11j (YES at Act 15), the CPU 11a identifies whether the response signal is acknowledgment or an error response is received (Act 16). In the case of acknowledgment (YES at Act 16), the CPU 11a displays the guide screen SC4 (see FIG. 12) in part area of the screen of the touch panel 11g (Act 17).

The guide screen SC4 allows the salesperson 21 to check the payment apparatus 12 which is the transmission destination of the payment information. An example of the guide screen SC4 is illustrated in FIG. 12. The guide screen SC4 includes a display area R5 and a button B5. The total number and the total amount of money in the total table 32a, and a message are displayed in the display area R5. For example, the message allows the salesperson 21 to which payment apparatus 12 is the transmission destination of the payment information, based on a message such as "Please perform payment with a payment apparatus B". The content of the message is not particularly limited. For example, the content may be "Payment is performed with the payment apparatus B", simply "Payment apparatus B", or only "B". The button B5 allows the salesperson 21 to close of the guide screen SC4. When the button B5 is operated, the CPU 11a closes the guide screen SC4, and completes the information processing for one transaction. Thereafter, the CPU 11 resumes the process from Act 1.

When the response signal is the error response instead of the acknowledgment (NO at Act 16), the CPU 11a performs a non-transmission process (Act 18). The non-transmission process is, for example, a process for informing the salesperson 21 that the payment information transmitted through the process of Act 14 is not stored in any payment apparatuses 12 provided in the same check-out lane. Further, the non-transmission process includes, for example, notifying the salesperson 21 that the payment process for the payment information is performed in the merchandise registration apparatus 11, and executing the payment process. In addition, the non-transmission process is not limited to executing the payment process in the merchandise registration apparatus 11. For example, a payment apparatus to be shared with respective check-out lanes may be provided in the service counter of the store, and the payment information for which the error response was transmitted may be transmitted to the shared payment apparatus through the network 13.

When the non-transmission process is completed, the CPU 11a completes the information processing for one transaction. Thereafter, the CPU 11 resumes the process from Act 1.

When the acknowledgment signal is received from the payment apparatus 12, the salesperson 21 who confirms the guide screen SC4 displayed on the touch panel 11g notifies the shopper 22 that payment is to be performed with the payment apparatus 12 identified in the guide screen SC4. The shopper 22 who receives the notification moves to the payment apparatus 12, and performs an operation for payment.

Next, the operation of the payment apparatus 12 will be described.

When the payment apparatus 12 is started, the CPU 12a starts the control process of the procedure illustrated in the flowchart in FIG. 9. First, the CPU 12a initializes the busy flag F of the memory area 42 to "0" (Act 21). Further, the CPU 12a sets the screen on the touch panel 12g as a standby screen (Act 22). The standby screen represents a situation where the payment process is not being performed, and the information represented on the standby screen may be optional. For example, it is assumed that the standby screen represents a message indicating that it is not ready to perform the payment process, or displays any image representing advertisement or the like as a screen saver.

The processing procedures of Act 21 and Act 22 are not limited to the procedure indicated in FIG. 9. For example, the process of Act 22 may first be performed, and the process of Act 21 may later be performed.

The CPU 12a may also execute the reception interrupt process illustrated in FIG. 10 in parallel with the control process. Upon receipt of information in which the communication address that is set in the communication unit 12j is the transmission destination address, the reception interrupt process is started.

When the reception interrupt process is started, the CPU 12a first identifies whether or not the received information is the payment information (Act 31). The received information includes a type code indicating the type of information. The CPU 12a identifies whether or not the received information is the payment information, based on the type code. When the received information is information other than the payment information (NO at Act 31), the CPU 12a executes the information processing according to the type of the received information.

When the received information is the payment information (YES at Act 31), the CPU 12a checks the busy flag F (Act 32). Here, when the busy flag F is set as "0" (NO at Act 32), that is, when the payment apparatus 12 does not execute the payment process, the CPU 12a notifies the control process of the receipt of the payment information (Act 33).

In contrast, when the busy flag F is set as "1" (YES at Act 32), that is, when the payment apparatus 12 executes the payment process, the CPU 12a checks whether or not the transfer destination ID is stored in the memory area 43 (Act 34). When the transfer destination ID is not stored in the memory area 43 (NO at Act 34), the CPU 12a transmits an error response signal to the merchandise registration apparatus 11 which is arranged in the same check-out lane (Act 35).

Specifically, the CPU 12a controls the communication unit 12j so as to transmit the error response signal over the network 13, by using the communication address that is set in the merchandise registration apparatus 11 as a transmission destination address, and by using the communication address that is set in the payment apparatus as the source address. Thus, the error response signal is transmitted to the merchandise registration apparatus 11 through the network 13.

In contrast, when the transfer destination ID is stored in the memory area 43 (YES at Act 34), the CPU 12a acquires the transfer destination ID from the memory area 43 (Act 36). The CPU 12a transfers the payment information to the single payment apparatus 12 that is identified by the transfer destination ID (Act 37).

Specifically, the CPU 12a controls the communication unit 12j so as to transmit the payment information that is received through the network 13 by using the communication address that is set in a single payment apparatus 12 identified by the transfer destination ID as a transmission destination address, and by using the communication address that is set in the payment apparatus as the source address. Thus, the payment information is transmitted to a single payment apparatus 12 that is identified by the transfer destination ID through the network 13. In this manner, the transfer destination ID is associated with the communication address that is set in the payment apparatus 12. Alternatively, the transfer destination ID may be the communication address that is set in the payment apparatus 12.

Referring again to FIG. 9, the CPU 12a that completes the processes of Act 21 and Act 22 waits for the reception of the payment information (Act 23). When the notification about the reception of the payment information is received through the process of Act 33 of the reception interrupt process, the CPU 12a stores the payment information received from the communication unit 12j in the payment buffer 41 (Act 24). Further, the CPU 12a sets the busy flag F as "1" (Act 25).

The processing procedures of Act 24 and Act 25 are not limited to the procedure indicated in FIG. 9. For example, the process of Act 25 may first be performed, and the process of Act 24 may later be performed.

The CPU 12a that completes the processes of Act 24 and Act 25 transmits the acknowledgment signal to the merchandise registration apparatus 11 which is provided in the same check-out lane (Act 26).

Specifically, the CPU 12a controls the communication unit 12j so as to transmit the acknowledgment signal to the network 13, by using the communication address that is set in the merchandise registration apparatus 11 as a transmission destination address, and by using the communication address that is set in the payment apparatus as the source address. Thus, the acknowledgment signal is transmitted to the merchandise registration apparatus 11 through the network 13.

Thereafter, the CPU 12a displays the payment screen SC3 (see FIG. 11) in part area of the screen of the touch panel 12g (Act 27).

An example of the payment screen SC3 is illustrated in FIG. 11. The payment screen SC3 includes display areas R6 and R7, and buttons B6, B7 and B8. An operation guide for the shopper 22 who operates the payment apparatus 12 is displayed in the display area R6. The total number and the total amount of money, which are included in the payment information stored in the payment buffer 41, are displayed in the display area R7. The button B6 allows the shopper 22 to designate cash as the payment method. The button B7 allows the shopper 22 to designate electronic money as the payment method. The button B8 allows the shopper 22 to call the salesperson 21. In the following description, the button B6 is referred to as a cash button B6, the button B7 is referred to as an electronic money button B7, and the button B8 is referred to as a salesperson call button B8.

The shopper 22 who checks the payment screen SC3 determines whether to pay in cash or in electronic money. In the case of paying in cash, the shopper touches the cash button B6, and puts cash of the total amount of money or more into the automatic change machine 12e. Meanwhile, in the case of paying in electronic money, the shopper touches the electronic money button B7 so as to cause the card reader and writer 12i to read the data in the electronic money card.

The CPU 12a that displays the payment screen SC3 waits for the touch of the cash button B6 or the electronic money button B7 (Act 28). When the cash button B6 or the electronic money button B7 is touched, the CPU 12a executes the payment process according to the payment method selected by the touched button (Act 29). In other words, when the cash button B6 is touched, the CPU 12a executes the payment process for the cash payment. When the electronic money button B7 is touched, the CPU 12a executes the payment process for the electronic money payment. Since these payment processes are well known in the existing self POS terminal, the description thereof will be omitted here.

Incidentally, the payment method is not limited to the cash or the electronic money. For example, the payment apparatus 12 can also treat payment methods such as credit cards, and vouchers such as gift certificates.

When the payment process is completed, the CPU 12a executes a receipt issuing process (Act 30). The CPU 12a edits the print data of the receipt based on the payment information that is stored in the payment buffer 41. The CPU 12a operates the printer 12h so as to issue a receipt. When the receipt is issued, the CPU 12a returns to the process of Act 4. The CPU 12a repeats the subsequent processes in a manner similar to those described above.

In this manner, in the check-out system 10 according to the present embodiment, when the registration of merchandise to be purchased is completed by the salesperson 21 in the merchandise registration apparatus 11, and the salesperson 21 touches the send button B4 on the send screen SC2, the payment information including the sales data of the purchase merchandise is transmitted to one payment apparatus 12 which is identified with the transmission ID which is set in the memory area 33, among a plurality of payment apparatuses 12 arranged in the same check-out lane as the merchandise registration apparatus 11.

Here, for convenience of explanation, as illustrated in FIG. 1, the number of payment apparatuses which are arranged in the same check-out lane as the merchandise registration apparatus 11 is three, and the payment apparatuses are respectively identified with reference numerals 12-1, 12-2, and 12-3. The payment apparatus 12-1 is identified with the transmission destination ID stored in the memory area 33 of the merchandise registration apparatus 11. In this case, the payment information is first transmitted to the payment apparatus 12-1.

In a case where the payment apparatus 12-1 is not executing a payment process, that is, in a case where the busy flag F is set as "0", the payment information is stored in the payment buffer 41 of the payment apparatus 12-1. In addition, an acknowledgment signal is transmitted to the merchandise registration apparatus 11 from the payment apparatus 12-1. As a result, a guide screen SC4 indicating that the transmission destination of the payment information is the payment apparatus 12-1 is displayed on the touch panel 11g of the merchandise registration apparatus 11. Thus, the salesperson 21 guides the shopper 22 to perform payment in the payment apparatus 12-1.

The shopper 22 moves to the payment apparatus 12-1. In this case, since the payment screen SC3 is displayed on the touch panel 12g of the payment apparatus 12-1, the shopper 22 performs payment by using cash, electronic money, or the like.

In contrast, in a case where the payment apparatus 12-1 is executing a payment process when the payment information is transmitted, that is, in a case where the busy flag F is set as "1", the process proceeds depending on whether or not a transfer destination ID is stored in the memory area 43 of the payment apparatus 12-1. In this example, a transfer destination ID of payment apparatus 12-2 is stored as the transfer destination ID. Also in this example, a transfer destination ID of payment apparatus 12-3 is stored as the transfer destination ID in the memory area 43 of the payment apparatus 12-2. Also in this example, a transfer destination ID is not stored in the memory area 43 of the payment apparatus 12-3.

Since the transfer destination ID of payment apparatus 12-2 is stored in the memory area 43 of the payment apparatus 12-1, the payment information transmitted from the merchandise registration apparatus 11 to the payment apparatus 12-1 is transferred to the payment apparatus 12-2 through the network 13.

In a case where a payment process is not being executed in the payment apparatus 12-2 when the payment information is received, that is, in a case where the busy flag F is set as "0", the payment information received from payment apparatus 12-1 is stored in the payment buffer 41 of the payment apparatus 12-2. In addition, an acknowledgment signal is transmitted to the merchandise registration apparatus 11 from the payment apparatus 12-2 based on the source address transmitted with the payment information. As a result, the guide screen SC4 indicating that the transmission destination of the payment information is the payment apparatus 12-2 is displayed on the touch panel 11g of the merchandise registration apparatus 11. Thus, the salesperson 21 guides the shopper 22 to perform payment in the payment apparatus 12-2.

The shopper 22 moves to the payment apparatus 12-2. In this case, since the payment screen SC3 is displayed on the touch panel 12g of the payment apparatus 12-2, the shopper 22 performs payment by using cash, electronic money, or the like.

In contrast, in a case where the payment apparatus 12-2 is executing a payment process when the payment information is received, that is, in a case where the busy flag F is set as "1", the process proceeds depending on whether or not a transfer destination ID is stored in the memory area 43 of the payment apparatus 12-2. Here, since a transfer destination ID of the payment apparatus 12-3 is set in the memory area 43, the payment information that is transferred from the payment apparatus 12-1 is transferred to the payment apparatus 12-3 through network 13.

In a case where the payment apparatus 12-3 is not executing a payment process when the payment information is received, that is, in a case where the busy flag F is set as "0", the payment information is stored in the payment buffer of the payment apparatus 12-3. In addition, an acknowledgment signal is transmitted to the merchandise registration apparatus 11 from the payment apparatus 12-3 based on the source address transmitted with the payment information. As a result, the guide screen SC4 indicating that the transmission destination of the payment information is the payment apparatus 12-3 is displayed on the touch panel 11g of the merchandise registration apparatus 11. Thus, the salesperson 21 guides the shopper 22 to perform payment in the payment apparatus 12-3.

The shopper 22 moves to the payment apparatus 12-3. In this case, since the payment screen SC3 is displayed on the touch panel 12g of the payment apparatus 12-3, the shopper 22 performs payment by using cash, electronic money, or the like.

In contrast, in a case where the payment apparatus 12-3 is executing a payment process when the payment information is received, that is, in a case where the busy flag F is set as "1", the process proceeds depending on whether or not a transfer destination ID is stored in the memory area 43 of the payment apparatus 12-3. Here, since the transfer destination ID is not stored in the memory area 43, an error response signal is transmitted from the payment apparatus 12-3 to the merchandise registration apparatus 11. As a result, in the merchandise registration apparatus 11, the non-transmission process is executed. In the non-transmission process, for example, the salesperson 21 processes the payment of shopper 22, by operating the merchandise registration apparatus 11.

Thus, according to the check-out system 10 according to the present embodiment, the merchandise registration apparatus 11 transmits the payment information to a single payment apparatus 12 that is set in advance as a transmission destination, regardless of the state of each payment apparatus 12. Therefore, an information analysis function of collecting and analyzing state information (status) from the payment apparatus 12 is not required.

When the payment process for the payment information is unavailable in the payment apparatus 12, the payment information that is transmitted from the merchandise registration apparatus 11 to a single payment apparatus 12 is transferred to another single payment apparatus 12 that is set in advance as a transfer destination. Therefore, since the salesperson 21 who operates the merchandise registration apparatus 11 does not waste time and effort in searching an unoccupied payment apparatus 12, it is possible to increase the work efficiency of the salesperson 21. Further, the salesperson is prevented from incorrectly transmitting the payment information to the payment apparatus 12.

In the present embodiment, the payment apparatus 12 to which the merchandise registration apparatus 11 transmits the payment information is determined based on the transmission destination ID, which is stored in the memory area 33. Similarly, another payment apparatus 12 to which the payment apparatus 12 incapable of performing the payment process transfers the payment information is determined based on the transfer destination ID, which is stored in the memory area 43. Therefore, according to whether or not the transmission destination ID and the transfer destination ID, which are respectively stored in the memory areas 33 and 43, are set, there is an advantage that whichever payment apparatus 12 the merchandise registration apparatus 11 preferentially transmits the payment information to and which route between the payment apparatuses 12 the payment information is transferred through can be easily set and changed.

The disclosure is not limited to the embodiment.

For example, the embodiment describes a case where the availability of the payment process for the received payment information is determined depending on whether or not the payment apparatus 12 is in the process of the payment process. An element for determining the availability of the payment process is not limited thereto. For example, even when an error affecting the payment occurs, such as a case where there is no receipt sheet in the printer 12h, it is possible to determine that the payment process for the received payment information is unavailable.

Further, in the embodiment, one check-out lane is set as one unit, and the merchandise registration apparatus 11 provided in the lane transmits the payment information to a single payment apparatus 12 arranged in the same lane. The case is described where the payment apparatus 12 transfers the payment information to another payment apparatuses 12 arranged in the same lane, when the payment process is unavailable in the payment apparatus 12. However, for example, the payment apparatus 12 which is provided in the adjacent check-out lane may also identified, as a transfer destination ID, which is stored in the memory area 43 of the payment apparatus 12. Thus, even when all of the payment apparatuses 12 arranged in the same lane are occupied, when the payment apparatus 12 which is provided in the adjacent check-out lane is unoccupied, the payment apparatus 12 can perform payment.

In addition, the embodiment describes a case where the transfer destination ID is not stored in the memory area 43 of the payment apparatus 12 to which the payment information is last transferred. In this regard, the transmission destination ID, which is stored in the memory area 33 of the merchandise registration apparatus 11, is stored in the memory area 43 of the payment apparatus 12 to which the payment information is last transferred. Thus, even when all of the payment apparatuses 12 arranged in the same lane are temporarily occupied, the payment information is transmitted among the payment apparatuses until one shopper completes a payment. Then, the payment information is received by the newly unoccupied payment apparatus 12, and it is possible to guide a shopper to the unoccupied payment apparatus 12.

In addition, the embodiment describes a case where the merchandise registration apparatus 11 displays the guide screen SC4 for the salesperson 21. In this regard, for example, a display device for a shopper may be connected to the merchandise registration apparatus 11 and the guide screen SC4 may be displayed on this display device so as to guide the shopper 22. Alternatively, it is also possible to direct the shopper 21 to the payment apparatus 12 that will perform the payment processing through sound, by utilizing an informing unit, such as voice synthesis unit or the like.

In addition, although the description of the embodiment is made with the act of purchasing merchandise as a transaction, the transaction may not involve acts of purchasing merchandise. For example, the check-out system may be applicable to transaction for which provided services are charged, such as use fee for facilities, rental fee for items.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A check-out system, comprising:
   a registration apparatus provided in a store; and
   a plurality of self-service payment apparatuses provided in the store in communication with each other and with the registration apparatus in the store, wherein
   the registration apparatus includes:
      a first communication unit, and
      a registration processor programmed to control the first communication unit to transmit payment request information for requesting a payment for a transaction to one of the plurality of the self-service payment apparatus; and
   each of the self-service payment apparatuses includes:
      a second communication unit,
      a display, and
      a payment processor programmed to:
         control the second communication unit to receive the payment request information via a network,
         determine whether or not the self-service payment apparatus itself is available to currently process the received payment request information based on previously-received payment request information that has not been processed,
         control the display to provide a notification to a customer that the self-service payment apparatus itself is available to currently process payment for the transaction of the customer and process a payment in accordance with the received payment request information, when determining that the self-service payment apparatus itself is available to currently process the received payment request information, and
         control the second communication unit to transfer the received payment request information to another self-service payment apparatus of the plurality of self-service payment apparatuses, when determining that the self-service payment apparatus itself is unavailable to currently process the received payment request information.

2. The check-out system according to claim 1, wherein the payment request information includes payment information required for processing the payment.

3. The check-out system according to claim 1, wherein the payment processor is further programmed to refer to a busy flag indicating whether or not there is previously-received payment request information that has not been processed.

4. The check-out system according to claim 1, wherein the registration processor is further programmed to control the first communication unit to transmit the payment request information to a predetermined one self-service payment apparatus of the plurality of self-service payment apparatuses.

5. The check-out system according to claim 4, wherein the registration apparatus further includes a memory that stores, in advance, a transmission destination address corresponding to the predetermined one self-service payment apparatus.

6. The check-out system according to claim 1, wherein the payment processor controls the second communication unit to transfer the received payment request information to a predetermined another self-service payment apparatus of the plurality of self-service payment apparatuses, when determining that the self-service payment apparatus itself is unavailable to currently process the received payment request information.

7. The check-out system according to claim 6, wherein the self-service payment apparatus further includes a memory that stores, in advance, a transmission destination address corresponding to the predetermined another self-service payment apparatus.

8. A self-service payment apparatus for use in a check-out system including a plurality of the self-service payment apparatuses in a store in communication with each other and with a registration apparatus in the store, the self-service payment apparatus comprising:
   a communication unit configured to receive payment request information for requesting a payment for a transaction via a network;
   a display; and
   a processor programmed to:
      determine whether or not the self-service payment apparatus itself is available to currently process the received payment information based on previously-received payment information that has not been processed,
      control the display to provide a notification to a customer that the self-service payment apparatus itself is available to currently process payment for the transaction of the customer and process a payment in accordance with the received payment request information, when the self-service payment apparatus itself is available to currently process the received payment request information, and
      control the communication unit to transfer the received payment request information to another self-service payment apparatus of the plurality of self-service payment apparatuses, when determining that the self-service payment apparatus itself is unavailable to currently process the received payment request information.

9. The self-service payment apparatus according to claim 8, wherein the payment request information includes payment information required for processing the payment.

10. The self-service payment apparatus according to claim 9, further comprising:
    a memory, wherein the processor is further programmed to:

control the memory to store the received payment request information when determining that the self-service payment apparatus itself is available to process payment, and process the payment based on the payment request information stored in the memory.

11. The self-service payment apparatus according to claim 9, wherein the processor is further programmed to refer to a busy flag set in the memory, the busy flag indicating whether or not there is previously-received payment request information that has not been processed.

12. The self-service payment apparatus according to claim 8, wherein the processor controls the communication unit to transfer the received payment request information to a predetermined another self-service payment apparatus of the plurality of self-service payment apparatuses, when determining that the self-service payment apparatus itself is unavailable to currently process the received payment request information.

13. The self-service payment apparatus according to claim 12, further comprising:

a memory that stores, in advance, a transmission destination address corresponding to the predetermined another self-service payment apparatus.

14. A non-transitory computer readable medium containing instructions for a self-service payment apparatus in a check-out system including a plurality of the self-service payment apparatuses in communication with each other and with a registration apparatus, the instructions causing the self-service payment apparatus to perform the steps of:

receiving payment request information for requesting a payment for a transaction via a network;

determining whether or not the self-service payment apparatus is available to currently process the received payment information based on previously-received payment request information that has not been processed, providing a notification to a customer that the self-service payment apparatus itself is available to currently process payment for a transaction of the customer and processing the payment in accordance with the payment information, when determining that the self-service payment apparatus itself is available to currently process the received payment request information; and transmitting the received payment request information to another self-service payment apparatus of the plurality of self-service payment apparatuses, when determining that the self-service payment apparatus itself is unavailable to currently process the received payment request information.

15. The non-transitory computer readable medium according to claim 14, wherein the payment request information includes payment information required for processing the payment.

16. The non-transitory computer readable medium according to claim 15, the instructions further causing the self-service payment apparatus to perform the step of:

storing, in a memory, the received payment request information when determining that the self-service payment apparatus itself is available to process payment, wherein the payment is processed based on the payment request information stored in the memory.

17. The non-transitory computer readable medium according to claim 14, the instructions further causing the self-service payment apparatus to perform the step of:

setting a busy flag set in a memory to indicate whether or not there is previously-received payment request information that has not been processed.

18. The non-transitory computer readable medium according to claim 17, the instructions further causing the self-service payment apparatus to perform the step of:

referring to the busy flag set in the memory to determine whether the self-service payment apparatus can currently process payment.

19. The non-transitory computer readable medium according to claim 14, wherein the received payment request information is transferred to a predetermined another self-service payment apparatus of the plurality of self-service payment apparatuses, when determining that the self-service payment apparatus itself is unavailable to currently process the received payment request information.

20. The non-transitory computer readable medium according to claim 19, wherein a transmission destination address corresponding to the predetermined another self-service payment apparatus is stored in advance.

* * * * *